Oct. 23, 1945.  D. B. PALL  2,387,287
METHOD FOR PRODUCING SODIUM CYANIDE
Filed July 9, 1942

INVENTOR
DAVID B. PALL
BY Milton Zucker
ATTORNEY

Patented Oct. 23, 1945

2,387,287

UNITED STATES PATENT OFFICE 2,387,287

METHOD FOR PRODUCING SODIUM CYANIDE

David B. Pall, New York, N. Y., assignor to Interchemical Corporation, New York, N. Y., a corporation of Ohio Application July 9, 1942, Serial No. 450,257

2 Claims. (Cl. 23—82)

This invention relates to gas reactions, and aims to provide a simple and economical method and apparatus for the circulation of gaseous reactants, characterized by low operation cost, economy in the use of gaseous reactants, and the unique ability to handle highly corrosive gases with a minimum of corrosion.

In prior art methods involving gaseous reactants, the gases emerging from the reaction chamber have either been vented, directly or after stripping of solidifiable liquefiable and adsorbable components when the reactant is relatively cheap, or have been elaborately purified, and pumped back into the system, whenever the gaseous reactant was sufficiently expensive to pay for the cost of recovery. Corrosive gases have been especially hard to handle and difficult to control.

My invention is directed to a method and apparatus for recirculating gases, characterized by such low cost that even relatively cheap gases can be economically recirculated; the problem of corrosion is also largely controlled. In my method, a chamber is provided carrying a liquid which may be a stripping liquid for the product of the reaction chamber; the liquid is circulated from the chamber through an aspirator and back into the chamber. The aspirator draws gas from the exhaust end of the reaction chamber, into the liquid; the gas and liquid separate in the container, and the gas is forced into the reaction chamber by the greater pressure in the container relative to that in the reaction chamber.

My invention is also directed to the use of the method and apparatus in the Bucher process for making sodium ferrocyanide.

The invention can perhaps best be understood by referring to the accompanying drawing, in which—

Figure 1:
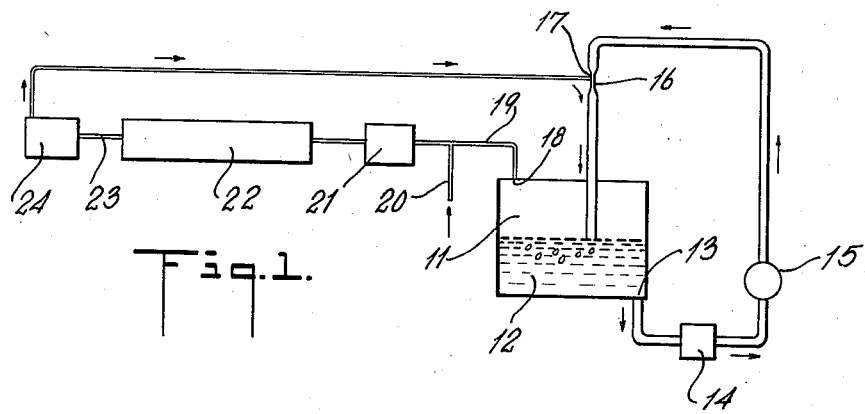
Fig. 1 is a schematic layout of my new apparatus.

Referring to Fig. 1, a chamber 11 is provided containing a liquid 12. It has a liquid discharge port 13 which carries the liquid through a treatment compartment 14 (although this may be eliminated) and a pump 15 through a ventum aspirator tube 16 and back into the chamber. The liquid is continuously circulated through the system; it draws gas into the system at the gas intake of the aspirator 17, and discharges it through the opening 18 in the chamber 11, over the liquid level.

The gas from the chamber passes into a tube 19, provided with an intake 20 for fresh gas; if necessary, a purification system 21 is provided, prior to the entrance of the gas into the reaction chamber 22. After the reaction, the gas passes into the exhaust tube 23, through an optional stripping system 24, and into the aspirator through the gas intake 17.

Obviously, the liquid 12 should not be such a powerful solvent for the gas that it will not release it; most preferably, in the case of corrosive gases, the liquid is one which will not produce a corrosive solution of the gas.

Figure 2:
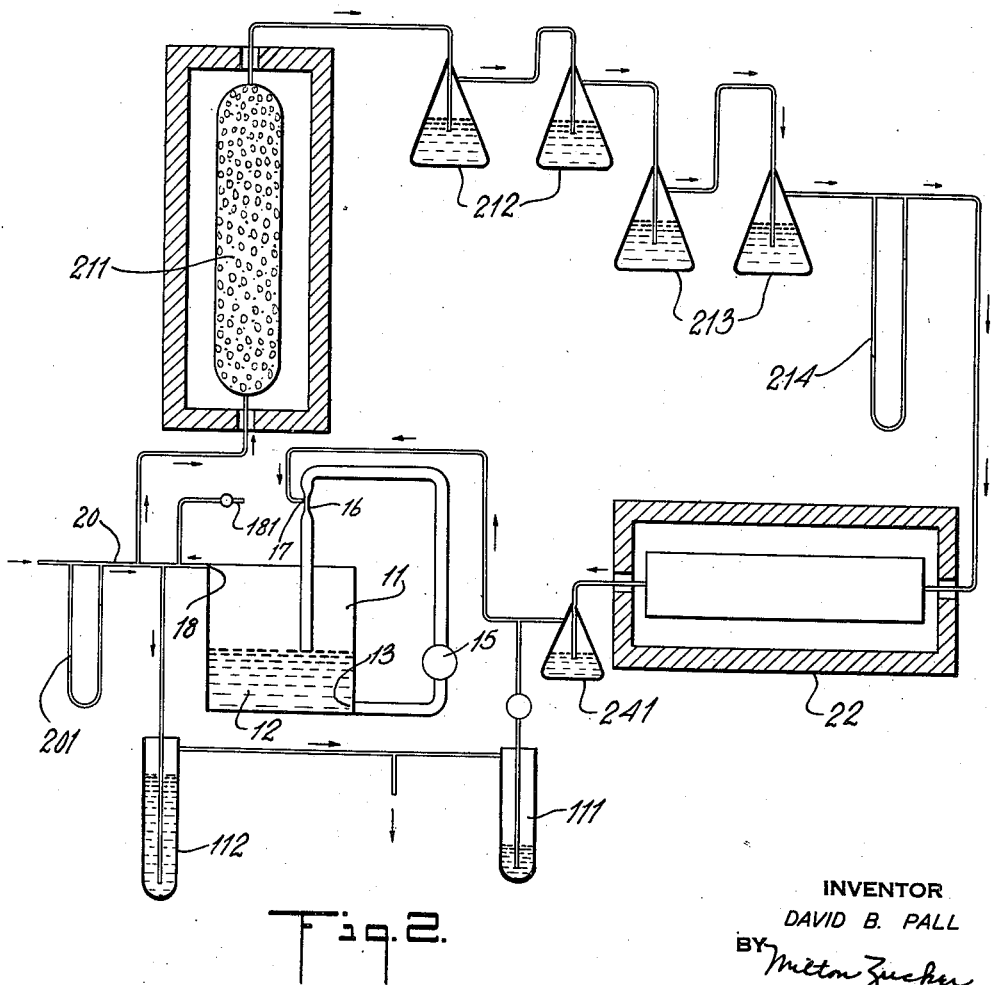
Fig. 2 is a schematic layout of the apparatus specifically designed for the Bucher process.

The treatment compartment 14, the purification system 21, and the stripping system 24 will be changed or omitted, depending on the various processes carried out in the system. In Fig. 2, a specific utilization of the system for the Bucher cyanide process (involving the reaction of iron, carbon, soda ash and nitrogen) is disclosed.

In this application of the invention, the circulating liquid 12 in the chamber 11 is water, and the gas circulated is nitrogen. The treatment compartment 14 is omitted, since it is unnecessary. The circulation system is provided with a vacuum release 111 and a pressure release 112 to allow the discharge of exit gas which is in excess of the fresh nitrogen requirements.

In the reaction chamber 22, sodium carbonate, finely divided iron, or iron oxide, and carbon, are reacted with pure nitrogen, to produce sodium cyanide and other solids, water vapor and carbon monoxide, by heating the reactants to 940° C. The mixture of excess nitrogen and carbon monoxide produced, together with a small amount of sodium vapor and vaporized or suspended sodium carbonate, is passed through a water trap 241 before it is drawn back into the circulating system. Suspended solids, particularly sodium carbonate, dissolve in the circulating pump liquid, without clogging the pump.

The nitrogen and carbon monoxide mixture passes out of the chamber 11 through the gas exhaust 18, which is provided with a sampler 181 to permit of analysis of the exhaust gas. Compressed air, in amounts calculated as indicated below, is fed into the stream, at the intake 20; a flow meter 201 is provided to measure the amount introduced. The mixture of air, nitrogen and carbon monoxide is then passed through the purification system comprising first a tube 211, packed with a mixture of copper and cupric oxide catalyst, heated to about 500° C. Here the carbon monoxide is oxidized to carbon dioxide, and the mixture is then passed through a device for removing $CO_2$. This may be done by liquefaction or absorption in water under pressure in large scale work; in the drawing, a laboratory technique is used which comprises bubbling the gas through NaOH solution in bottles 212 to absorb the $CO_2$. The nitrogen is dried by dehydrating tubes or bottles 213, containing sulfuric acid or other dehydrating agents. A flow meter 214 measures the flow of purified nitrogen into the reaction chamber 22.

The carbon monoxide is removed by the simple oxidation of CO to $CO_2$ with the calculated amount of oxygen supplied from the air. This amount can be calculated from the formula:

$$\text{Air inflow} = \frac{5 \times \text{pure nitrogen flow rate} \times \text{CO concentration in exhaust}}{2 \text{ (CO concentration in exhaust} + 1)}$$

The nitrogen added in the air more than replaces that absorbed in the reaction; the excess is exhausted through the pressure or vacuum release valves.

In this process, the system has the advantage of permitting the use of the necessary large excesses of nitrogen economically, without the necessity for recovering huge quantities of nitrogen from air.

The apparatus and method may be used for other reactions. Thus, in the catalytic vapor phase reaction of phthalimide and ammonia to produce phthalonitrile, important economies can be effected by my method. The circulating gas in this instance is ammonia; the circulating liquid is saturated ammonia water. Phthalimide and any fresh ammonia needed are introduced into the apparatus at 20, to join the stream of ammonia which goes directly into the reactor with the elimination of the purification system 21. From the reactor, the gaseous reaction mixture passes directly into the aspirator, with the stripping system 24 being eliminated. The reaction mixture of phthalimide, phthalonitrile and ammonia is thoroughly mixed with the concentrated ammonia water. The phthalimide dissolves, the phthalonitrile precipitates, the ammonia passes off as a gas for recirculation. The phthalimide can be recovered from the ammonia water by tapping a portion of it off; the phthalonitrile is recovered by introducing a filter into the treatment compartment 14.

Obviously, my method of circulating gases may be widely applied to other chemical processes with similar good results.

I claim:

1. In the method of producing sodium cyanide by the reaction of carbon, sodium carbonate and pure nitrogen, the steps which comprise passing pure nitrogen into a reaction chamber containing carbon, sodium carbonate and an iron-bearing material heated to reaction temperature, withdrawing the mixture of nitrogen and carbon monoxide formed through an aspirator in which water is the circulating fluid, so that entrained sodium carbonate is removed from the gas, adding just sufficient air to oxidize the carbon monoxide to carbon dioxide, passing the carbon monoxide/nitrogen/air mixture through a copper oxide catalyst to heat it to about 500° C. to convert the carbon monoxide and oxygen in the air to carbon dioxide, decarbonating and dehydrating the gas thus formed, and passing the pure nitrogen resulting back into the reaction.

2. In the method of producing sodium cyanide by the reaction of carbon, sodium carbonate and pure nitrogen, the steps which comprise passing pure nitrogen into a reaction chamber containing carbon, sodium carbonate and an iron-bearing material heated to reaction temperature, withdrawing the mixture of nitrogen and carbon monoxide formed, together with entrained impurities, through a pumping system containing a liquid which removes the entrained impurities from the gas as it passes through the liquid, adding just sufficient air to oxidize the carbon monoxide to carbon dioxide, passing the carbon monoxide/nitrogen/air mixture through a copper oxide catalyst to heat it to about 500° C. to convert the carbon monoxide and oxygen in the air to carbon dioxide, decarbonating and dehydrating the gas thus formed, and passing the pure nitrogen resulting back into the reaction.

DAVID B. PALL.